United States Patent [19]

Jetten

[11] 4,064,540

[45] Dec. 20, 1977

[54] TIME REGISTRATION ARRANGEMENT PROVIDED WITH A TELEVISION CAMERA

[75] Inventor: Gerbrand Jetten, Eindhoven, Netherlands

[73] Assignee: U.S. Philips Corporation, Briarcliff Manor, N.Y.

[21] Appl. No.: 694,148

[22] Filed: June 9, 1976

[30] Foreign Application Priority Data

June 13, 1975 Netherlands ........................ 7507048

[51] Int. Cl.[2] ................................................ H04N 7/08

[52] U.S. Cl. .................................... 358/142; 358/127; 358/146; 358/183

[58] Field of Search ............... 358/127, 142, 146, 183, 358/49; 178/DIG. 1, DIG. 6, DIG. 36; 346/110; 340/323, 324 AD

[56] References Cited

U.S. PATENT DOCUMENTS 2,568,166 9/1951 Perry .................................... 358/183

3,898,644 8/1975 Baxter ........................... 178/DIG. 6

FOREIGN PATENT DOCUMENTS 1,041,590 9/1966 United Kingdom .................. 358/49

*Primary Examiner*—Richard Murray
*Attorney, Agent, or Firm*—Frank R. Trifari; Henry I. Steckler

[57] ABSTRACT

A time video registration arrangement in which, with the use of a television camera, a storage device and a display device, each constructed in accordance with a television standard, time measurements can be performed at intervals smaller than the standard field period. To that end the arrangement is provided with a signal generator for supplying a field synchronization-deflection signal to the camera, which signal has a repetition period which is an integral part of the field period, while a video signal of standard field frequency is applied to the storage device.

5 Claims, 3 Drawing Figures

TIME REGISTRATION ARRANGEMENT PROVIDED WITH A TELEVISION CAMERA

The invention relates to a time registration arrangement provided with a television camera, with a storage device for storing a video signal which is produced by the television camera and which represents a scene, and with a picture display device connected to the storage device.

Such a time video registration arrangement is known from German Pat. No. 2,047,653 which mentions the time measurement in sporting events as field of application. As in these events the time must be measured accurate to one-hundredth of a second it has been proposed to use a television system having a field frequency of 100 Hz whilst a light integration time equal to the field period of one hundredth of a second occurs in the television camera. The television camera, the storage device and the picture display device have been specially designed for the field frequency of 100 Hz, which deviates from the field frequency of 50 or 60 Hz laid down in television standards. Apart from the application of the specially designed and consequently expensive equipment, it holds in particular for the storage device that in practice the high field frequency of 100 Hz is a very stringent requirement to realize as yet in an acceptable functioning way.

It is an object of the invention to provide a time video registration arrangement provided with components designed and suitable for application in accordance with the television standard having a field period laid down therein, in which the time measurement can be effected at intervals smaller than the field period. The time registration arrangement according to the invention is therefore characterized in that the time registration arrangement is provided with a signal generator connected to the television camera for supplying to the camera a field synchronisation-deflection signal having a repetition rate which is essentially an integral part of the field period according to a television standard whilst a signal output of the television camera connected to the storage device carries a video signal having the field frequency in accordance with the standard.

It is achieved that the picture display device and the storage device operate at the standard field frequency, whilst the television camera, which is also designed for use in accordance with the standard can be operated with a field deflection signal having a field frequency which is two, three or more times higher. This enables periodical time measurements of a period of time of half, a third, a fourth etc. of the duration of the standard field period.

Figure 1:
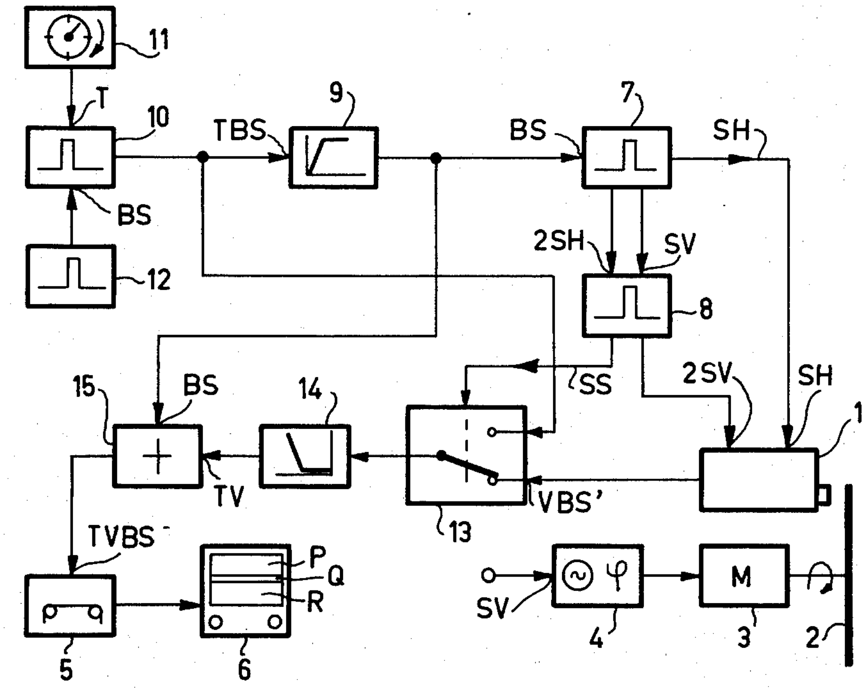
Figure 2:
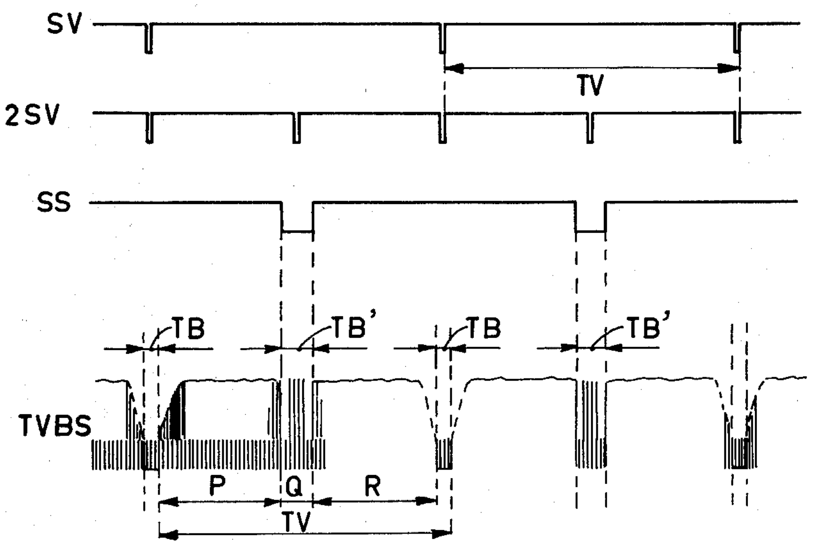
Figure 3:
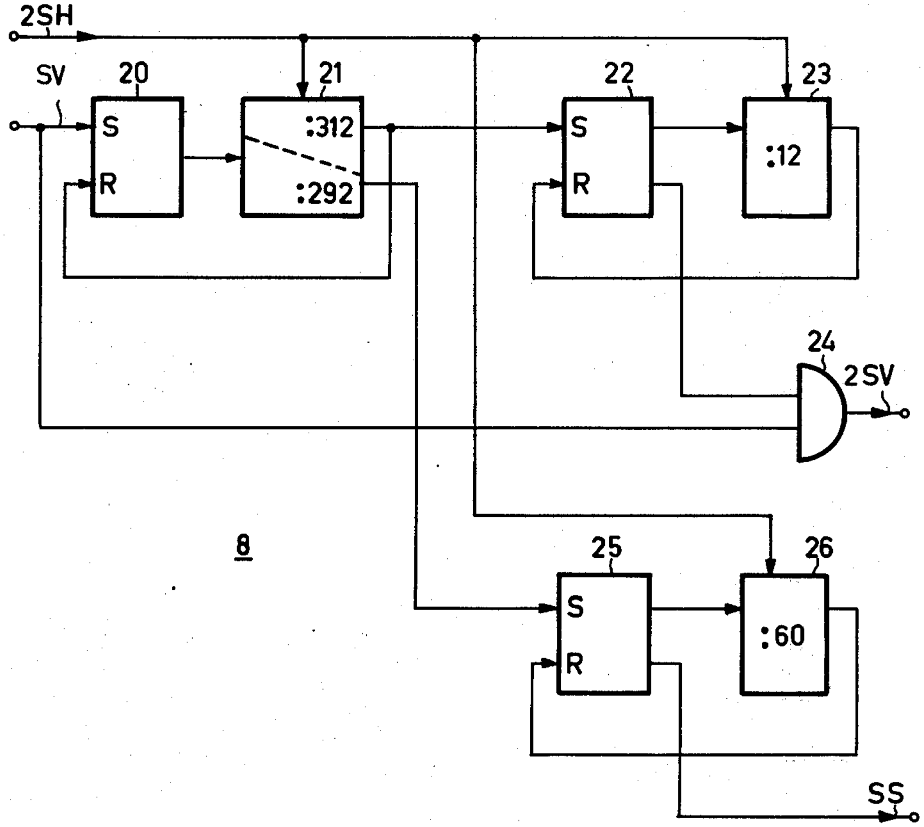

The invention will be explained with reference to the following figures which are given by way of non-limitative example, where FIG. 1 is a block diagram of an arrangement according to the invention, FIG. 2 shows some signals to illustrate the operation of the arrangement according to FIG. 1 as a function of the time and FIG. 3 is a block diagram of a signal shaper in a signal generator suitable for use in the arrangement according to FIG. 1.

Reference 1 in FIG. 1 indicates a television camera which is designed for use in accordance with a television standard and which is commercially available as a standard television camera. In what follows hereinafter a 50 Hz-standard will be described but this description also applies to a 60 Hz-standard with other times than the times mentioned. The camera 1 designed for the 50 Hz-standard normally has a field period of 20 ms in which a television raster composed of lines is formed in known manner for picking-up a scene. In the next field period a line raster is formed in an intermediate position while interlacing according to the standard is used. As there is normally no space between the lines of a line raster the light integration of the light derived from the scene is equal to the field period of 20 ms. To prevent, when motion occurs in the scene that the displacement occurring within the 20 ms would result in a blurred picture when the video signal produced by the camera 1 is displaced, it is known to place a light interrupting device in front of the camera 1, for example, in the shape of a rotatable disc 2 provided with apertures through which the light of the scene can periodically reach the camera 1. The disc 2 is driven by a motor 3 which is fed from a motor control circuit 4. A control signal SV, which will be explained later on is applied to the circuit 4. The circuit 4 is provided with a phase control ($\phi$) by means of which the period of time that an aperture of the disc 2 will pass the light of the scene to the camera 1 can be positioned in a field period. It holds, for example, that only during a time of approximately 1 ms light will be passed on to the camera, this 1 ms occurring in the so-called field blanking time. There is a light integration time of 1 ms which is followed by a field scan. This causes the scene to be picked-up for 1 ms with intervals of 20 ms in which movement blur is greatly eliminated.

To register the video signal produced by the camera 1 this signal is usually applied to the storage device 5. The storage device 5 may comprise a tape store, a disc store or otherwise. To observe the information in the scene the storage device 5 is connected to a picture display device 6. In the manner described sofar, without further measures, changes occurring in the scene can only be recorded, registered and observed at intervals of the field period of 20 ms.

With the arrangement of FIG. 1 according to the invention it is possible, while using the storage device 5 and the picture display device 6 which operate in accordance with the standard at 50 Hz to perform a time measurement, that is to say a time video registration which corresponds to 100 Hz; then picture registration is effected at intervals of one hundredth of a second. To that end, in the arrangement according to FIG. 1 a field synchronisation-deflection signal 2 SV is applied to the television camera 1. FIG. 2 shows the signal 2 SV as a function of the time. Furthermore the signal SV is shown for comparison. The signal SV is the field synchronisation-deflection signal or, in short, the field control signal as normally used. TV indicates the duration of a field period according to the standard. To obtain the line scan at the television camera 1, a line synchronisation-deflection signal or line control signal SH occurring at the line period is fed in the normal manner to the television camera 1 to obtain the line scan. The line control signal SH is supplied by the signal generator 7 which also supplies the normal field control signal SV and a signal 2 SH with pulses which occur at double the line frequency. The signals 2 SH and SV are applied to a signal shaper 8 which forms from them the signal 2 SV and a signal SS also shown in FIG. 2. For an example of a construction of the signal shaper 8 reference is made to FIG. 3 and the relevant description. The signal generator 7 and the signal shaper 8 together constitute the signal generator (7, 8) from which the camera is operated for the normally occurring line scan and the field scan effected in accordance with the invention, whilst as will appear the camera 1 supplies a video signal VBS' which has the standard repetition rates.

In the manner usual for television a blanking and synchronisation signal BS is applied to the signal generator 7. The signal BS comprises the described field- and line blanking and synchronisation pulses and the equalizing pulses. The signal BS is supplied by a signal limiting circuit 9 to which a time signal TBS is applied from a time signal generator 10. The time signal generator 10 is connected to an output of a time information generator 11 and of a signal generator 12. The time signal generator 10 supplies the time signal TBS as a normal video signal, which is laid down in the standard, with synchronisation, equalisation and blanking pulses, the picture signal having black level for part of the picture and, in the remaining picture part a time information in, for example, the form of a number. The specific construction of the generators 10 and 12 and the time information generator 11 is not relevant for the invention so that they will not be discussed here. It should only be noted that the generator 12 is, for example, provided with a very stable oscillator and that, during the introduction of the time information into the time signal TBS the time information must not run as otherwise the running number will be displaced.

The video signal VBS' derived from the television camera 1 and the time signal TBS derived from the time signal generator 10 are each supplied to an input of a switching stage 13. For switch-over into the switching stage 13 the signal SS is supplied to a switching input thereof. In each field period the switching stage 13 passes for part of the time, the time information of the time signal TBS, and during the remaining time of the field period, the scene information of the video signal VBS' is passed. The switching stage 13 is followed by a threshold circuit 14. Of the signal fed to the threshold circuit 14, the only part that passes is the picture signal TV with the time and scene information on to an adder circuit 15, to which also the blanking and synchronisation signal BS is supplied which is derived from the limiter circuit 9 and which is built up with the times laid down in the standard. The adder circuit 15 consequently supplies a time video signal TVBS which is built up with signal time periods as laid down in the relevant standard. It is namely usual to operate television cameras in such a way that the video signal (VBS') thus produced have the repetition rates according to the standard, but not the exact pulse times as laid down in the standard. For industrial applications of television cameras the deviation between the prescribed signal BS and the slightly altered signal BS' is permitted, which, however, does not apply when used in studios which work for broadcasting companies who require standardized video signals. The adder circuit 15 supplies a time video signal TVBS for storage in the storage device 5 and for ultimate display at the display device 6.

The following applies to the operation of the arrangement according to FIG. 1. The supply of the signal 2 SV of FIG. 2 to the camera 1 of FIG. 1 makes sure that in the camera 1 the field scan is effected in a normal way to halfway the field, whereafter instead of a move-on to the second half a field flyback to the beginning occurs. Thereafter the part of the field scanned in the previous half field period is scanned again. At the end of the second half field period the field flyback is effected at the normal instant where after the following field is scanned displaced in view of interlacing. Also here a field flyback occurs halfway during the field which must normally be scanned. After the scene information and the time information have been combined the signal TVBS shown in FIG. 2 is obtained. Reference TB gives some field blanking times according to this standard with, included therein pre-equalisation-field synchronisation-, final equalisation- and line synchronisation pulses. The flyback which is effected halfway during the field normally to be scanned occurs in the time durations TB' by the pulses then occurring in the signal 2SV. In the time durations TB' the scene information is not present in time video signal TVBS but the time information, which is realised by switching stage 13. References P, Q and R at the display device 6 of FIG. 1 indicate some parts of the displayed picture which correspond with the signal parts of the signal TVBS which are also so indicated. It appears that in the picture part P scene information is displayed which has been obtained, for example, via the disc 2 for 1 ms occurring in the preceding field blanking time TB. In the picture part Q the time information is, for example, given by means of a number which time information belongs, for example, to the above-mentioned 1 ms. In the picture part R scene information is again given which is included in 1 ms prevailing in the preceding time duration TB'. Between the recordings of the scene information for the picture parts P and R there was an interval of half a field period TV, which results in a 10 ms interval for the 50 Hz standard.

It is clear that the use for the camera 1 of the field control signal having the triple field frequency (3 SV) would result in the scan of one-third part of the normal field, with two additional flybacks in a standard field period TV. The result is that the scene information is recorded at intervals of one-third of the field period TV. Then a switching signal SS is formed having two switching pulses per field period TV whilst within the pulse duration thereof two pulses of a signal 3 SV are produced which occur outside the standard field blanking times TB.

The particular feature of the arrangement according to FIG. 1 is that a video signal is obtained which fully satisfies the requirement laid down in the standard, whilst a time video registration can be obtained having intervals equal to half, one-third, one-fourth of the standard field period.

In the manner described at FIG. 1 the field scan at the camera 1 only takes place for the first half of the normally scanned field. Consequently the scanned part of the field is no longer in the centre of the target plate of *a,* for example, camera tube used in the camera 1. Any desired displacement of the field part to be scanned to the centre where an improved linearity occurs at the scan, can be obtained in a simple manner by means of a possible adaptation of a centring resistor in a field deflection circuit present at camera 1.

The arrangement according to FIG. 1 is assembled as far as possible with standard equipment which is commercially available. As example it is mentioned that a Philips camera LDH 0025 might be used for the camera 1 whilst the Philips video mixer LDH 4010 comprises the signal generator 7, the circuits 9, 14 and 15 and the switching stage 13. It is also possible to connect a second camera to said video mixer, the result being that on the picture display device 6 two pictures are displayed side by side having each the P, Q and R composition described. For the signal generator 12 it holds that the Philips PM 5532 might be used for this purpose.

It appears that the signal shaper 8 occupies a fundamental place in the arrangement according to FIG. 1, this is the reason why a possible construction is shown in FIG. 3. When the signal SV with pulses of field frequency and the signal 2 SH with pulses of double the line frequency are applied, the signals 2 SV and SS are obtained. The signal SV of FIG. 2 is applied to a setting input S of a setting -resetting stage 20, which comprises a further setting input R. The stage 20, is followed by a divider stage 21 to which the signal 2 SH with the pulses of double the line frequency is also applied. After having been released by the stage 20 under the influence of the down-going pulse edge in the signal SV of FIG. 2, the divider stage 21 starts a pulse count to 312. Whereafter a pulse is applied to a first output, which pulse is applied to the resetting input R of the stage 20 which subsequently reverses, causing the divider stage 21 to be blocked and the pulse count to be stopped. The number 312 originates from the use of the signal shaper 8 in a 625-line standard. When a 525-line standard is used the number 262 or 263 would be, for example, have been chosen. The result is that after 312 pulses of double the line frequency the divider stage 21 delivers a pulse at the first output, which is applied to a setting-input S of a setting-resetting stage 22 and which causes the latter to change stage. A first output of the stage 22 is followed by a divider stage 23 to which also the signal 2 SH is applied. After the stage 22 has changed state and consequently the divider stage 23 has been released, twelve pulses are counted from the signal 2SH whereafter the divider stage 23 delivers a pulse to the resetting input R of the stage 22 which reverses and further blocks the divider stage 23. Consequently, at a second output of the stage 22 the down-going pulse with the logic 0 is found having a duration of 16 line periods. The second output of the stage 22 is connected to a first input of an AND-gate 24, to a second input of which the signal SV of FIG. 2 is applied which also has pulses with a duration of 6 line periods. The output of the AND-gate carries the signal 2 SV shown in FIG. 2.

The divider stage 21 is provided with a second output at which a pulse is produced after 292 pulses in the signal 2 SH with pulses which occur at double the line frequency. The second output of the divider stage 21 is connected to a setting input S of the setting-resetting stage 25. A first output of the stage 23 is connected to a release-blocking output of a divider stage 26 to which also the signal 2 SH is applied. After having been released by the reversing of the stage 25, the divider stage 26 counts 60 pulses which occur at double the line frequency and subsequently delivers a pulse to a resetting input R of the stage 25 which reverses thereupon and blocks the divider stage 26. Consequently, the signal SS of FIG. 2 is found at the second output of the stage 25 with a pulse duration of 30 line periods. The pulse in the signal 2 SV occurring in the pulse duration of the signal SS starts 10 line periods later, has a duration of 6 line periods and consequently ends 14 line periods earlier.

By adding the signal shaper 8, a time video registration can be effected with the further standard components of the arrangement according to FIG. 1 at intervals of an integral part of a field period. The scene which is then recorded may, for example, comprise a finish in a sporting contest or a turning point in a swimming contest. Instead, the scene may also comprise an (industrial) process in which it is desirable to use a time video registration.

What is claimed is:

1. A time registration circuit arrangement for use with a television camera and a display device, said circuit comprising a storage device means adapted to be coupled to said camera and said display device for storing a video signal which is produced by the television camera and which represents a scene, a signal generator means adapted to be coupled to the television camera for supplying to the camera a field synchronisation-deflection signal having a repetition frequency which is essentially an integral multiple of the field frequency according to a television standard, and means adapted to be coupled to the television camera and coupled to the storge device for providing a video signal having the field frequency in accordance with the standard.

2. A time registration circuit arrangement as claimed in claim 1, wherein said signal generator comprises a signal shaper comprising a pair of input means for receiving a standard field synchronisation signal and a signal having pulses which occur at double the line frequency respectively, and an output means for supplying said field synchronisation-deflection signal with pulses which occur at an integral multiple of said standard field frequency.

3. A time registration circuit arrangement as claimed in claim 2, wherein said signal shaper comprises an output means for supplying a switching signal which occurs at the field frequency, which switching signal comprises switching pulses having a pulse duration within which pulses occur which are present in said field synchronistion-deflection signal and which occur outside standard field blanking times.

4. A time registration circuit arrangement as claimed in claim 3, further comprising a time signal generator, and a switching stage having a switching input coupled to said switching signal output and a pair of input means adapted to be coupled to the television camera and coupled to said time signal generator respectively.

5. A time registration circuit arrangement as claimed in claim 2, wherein said signal shaper comprises setting-resetting stages, and divider stages each having input means for releasing and blocking coupled to said setting-resetting stages respectively, and input means for receiving the signal having pulses which occur at double the line frequency.

* * * * *